US008718838B2

(12) United States Patent
Kokkeby et al.

(10) Patent No.: US 8,718,838 B2
(45) Date of Patent: May 6, 2014

(54) SYSTEM AND METHODS FOR AUTONOMOUS TRACKING AND SURVEILLANCE

(75) Inventors: Kristen L. Kokkeby, Corona, CA (US);
Robert P. Lutter, Tacoma, WA (US);
Michael L. Munoz, Tacoma, WA (US);
Frederick W. Cathey, Seattle, WA (US);
David J. Hilliard, Shoreline, WA (US);
Trevor L. Olson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 882 days.

(21) Appl. No.: 11/956,711

(22) Filed: Dec. 14, 2007

(65) Prior Publication Data

US 2009/0157233 A1 Jun. 18, 2009

(51) Int. Cl.
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| G06F 17/10 | (2006.01) |
| G06G 7/78 | (2006.01) |
| G08G 1/16 | (2006.01) |

(52) U.S. Cl.
USPC ................................................ 701/3; 701/301

(58) Field of Classification Search
USPC ........................................................ 701/3, 301
See application file for complete search history.

(56) References Cited

U.S. PATENT DOCUMENTS 6,975,246 B1 * 12/2005 Trudeau ........................ 340/903

(Continued)

FOREIGN PATENT DOCUMENTS

EP 1 857 768 11/2007

OTHER PUBLICATIONS

Dogan et al.; "Unmanned Aerial Vehicle Dynamic-Target Pursuit by Using Probabilistic Threat Exposure Map"; Journal of Guidance, Control and Dynamics; vol. 29, No. 4, pp. 944-945; Jul. 2006.

(Continued)

*Primary Examiner* — Imran Mustafa
(74) *Attorney, Agent, or Firm* — Yee & Associates, P.C.

(57) ABSTRACT

A system and methods for autonomously tracking and simultaneously providing surveillance of a target from air vehicles. In one embodiment the system receives inputs from outside sources, creates tracks, identifies the targets and generates flight plans for unmanned air vehicles (UAVs) and camera controls for surveillance of the targets. The system uses predictive algorithms and aircraft control laws. The system comprises a plurality of modules configured to accomplish these tasks. One embodiment comprises an automatic target recognition (ATR) module configured to receive video information, process the video information, and produce ATR information including target information. The embodiment further comprises a multi-sensor integrator (MSI) module configured to receive the ATR information, an air vehicle state input and a target state input, process the inputs and produce track information for the target. The embodiment further comprises a target module configured to receive the track information, process the track information, and produce predicted future state target information. The embodiment further comprises an ownship module configured to receive the track information, process the track information, and produce predicted future state air vehicle information. The embodiment further comprises a planner module configured to receive the predicted future state target information and the predicted future state air vehicle information and generate travel path information including flight and camera steering commands for the air vehicle.

20 Claims, 6 Drawing Sheets

(56) References Cited

U.S. PATENT DOCUMENTS

| | | | |
|---|---|---|---|
| 7,127,334 | B2 | 10/2006 | Frink |
| 7,299,130 | B2 | 11/2007 | Mulligan et al. |
| 8,102,423 | B2 | 1/2012 | Cheng |
| 2001/0043721 | A1* | 11/2001 | Kravets et al. ............... 382/107 |
| 2004/0125228 | A1* | 7/2004 | Dougherty ................ 348/345 |
| 2004/0249519 | A1 | 12/2004 | Frink |
| 2006/0077255 | A1* | 4/2006 | Cheng ........................ 348/143 |
| 2007/0250260 | A1 | 10/2007 | Ariyur et al. |
| 2008/0071431 | A1 | 3/2008 | Dockter et al. |
| 2008/0117858 | A1 | 5/2008 | Kauffman |
| 2010/0042269 | A1 | 2/2010 | Kokkeby et al. |
| 2010/0121574 | A1* | 5/2010 | Ariyur et al. ................ 701/301 |
| 2010/0250022 | A1* | 9/2010 | Hines et al. ...................... 701/2 |

OTHER PUBLICATIONS

Lee et al.; "Strategies of Path-Planning for a UAV to Track a Ground Vehicle"; The Second Annual Symposium on Autonomous Intelligent Networks and Systems; Jun. 30, 2003 to Jul. 1, 2003; Menlo Park, CA, US; http://path.berkeley.edu/ains/final/002%20-%2008-hedrick.pdf; Retrieved from the Internet on May 13, 2009.

Rafi et al.; "Autonomous Target Following by Unmanned Aerial Vehicles"; Proceedings of the SPIE—The International Society for Optical Engineering; vol. 6230, No. 1, pp. 1-8; 2006.

Hoffmann et al.; "UAV Sensor-Suite Demonstrator"; Workshop Der DGLR Fachausschüsse T6.2 Avionik und Sensorik & T6.3 Informationsverarbeitung und Automation; Feb. 14, 2007; Neubiberg B. Munchen; http://www.t6.dglr.de/Veranstaltungen/2007_UAV_Fuehrungsaspekte/11Hoffman/UAV_Sensor-Suite_DGLR_2007,pdf; pp. 1-23; Retrieved from the Internet on May 12, 2009.

Search Report from EPO on co-pending EP application (08171682.1) dated May 26, 2009.

USPTO non-final office action dated Jul. 12, 2012 regarding U.S. Appl. No. 12/334,325, 13 pages.

Final Office Action, dated Jan. 11, 2013, regarding USPTO U.S. Appl. No. 12/334,325, 18 pages.

Non-final office action dated Aug. 1, 2013 regarding U.S. Appl. No. 12/334,325, 15 pages.

* cited by examiner

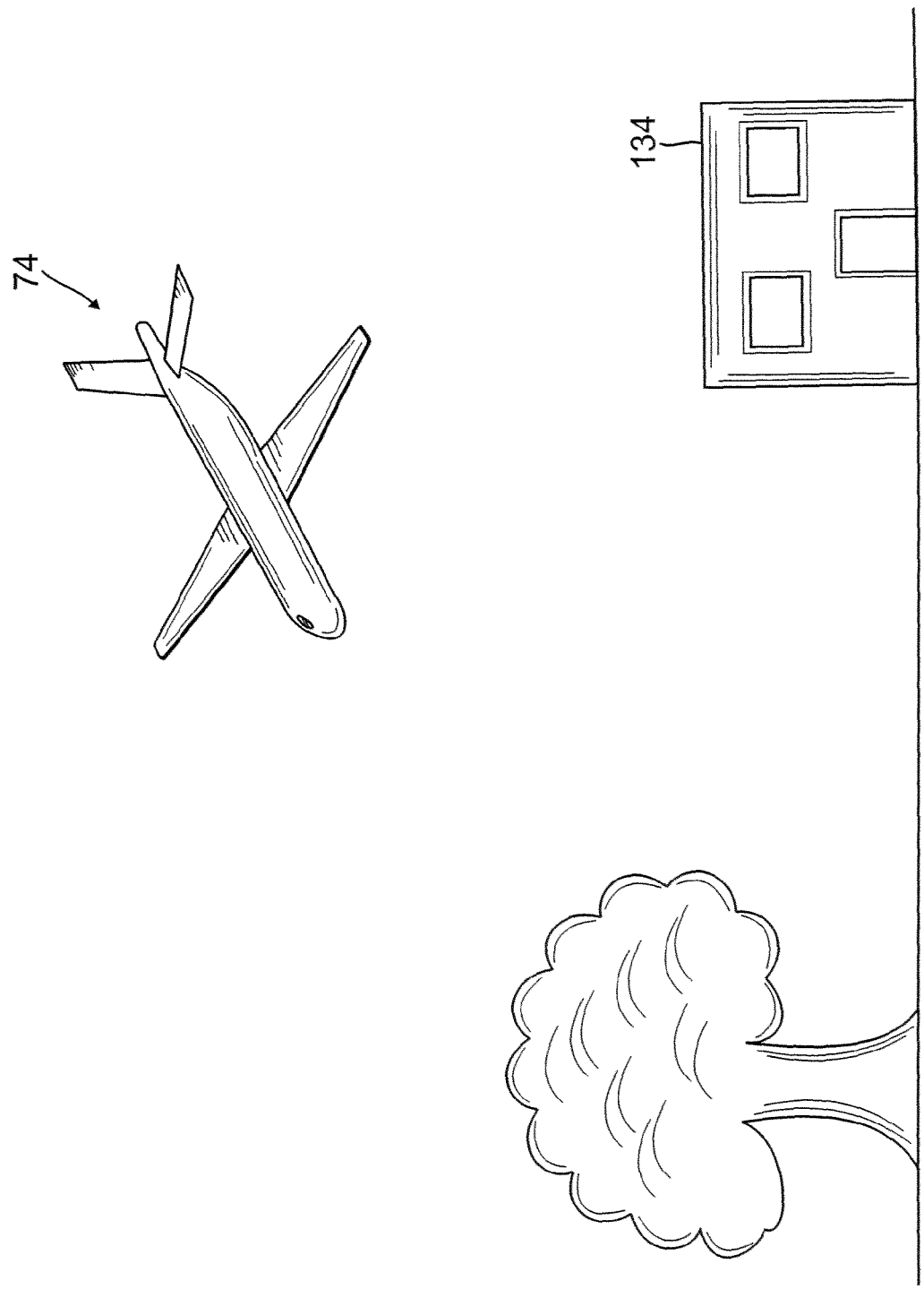

SYSTEM AND METHODS FOR AUTONOMOUS TRACKING AND SURVEILLANCE

BACKGROUND

1. Technical Field

The present disclosure relates to control of unmanned air vehicles (UAVs), tracking of moving targets and surveillance of areas, stationary targets and moving targets.

2. Description of Related Art

Aerial surveillance and tracking includes the use of unmanned air vehicles. Currently human operators remotely control UAVs. The operators must steer both the UAV and the camera/surveillance payload in order to maintain tracking and positive identification of a moving target. Positive identification may require no interruptions or obstructions in visual observation of the target. This practice is labor intensive, and therefore expensive. Usually two operators track a single target, enabling one operator to control flight and the other operator to control camera pointing, focus, zoom, etc. And in military applications involving hill value targets, such as known terrorists, usually two UAVs are dedicated to the target, thus requiring four operators. Remotely controlling UAVs with human operators is also prone to loss of positive identification due to bad vehicle position or bad camera angle. Current methods also do not adequately support real time collection of target attribute data. In addition, the operators must pay special attention to no fly zones, restricted airspace and obstructions, further increasing the difficulty of maintaining an uninterrupted track.

SUMMARY

The embodiments of the present system and methods for autonomous tracking and surveillance have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description", one will understand how the features of the present embodiments provide advantages, which include a reduction in the number of human operators needed to operate the system, which in turn translates into cost savings, a reduction in the likelihood that tracked targets will be lost, a decrease in the risk that UAVs will be lost due to crashes/collisions, and a decrease in the risk that UAVs will enter no fly zones.

One aspect of the present system and methods for autonomous tracking and surveillance includes the realization that current systems for tracking and surveillance are heavily dependent upon human operators. This dependence upon humans is costly, and subject to losses of target/track data due to bad vehicle position or bad camera angle. Human error is frequently to blame for these losses. Accordingly, a system and methods for automating surveillance, targeting and tracking functions would save costs and reduce errors.

One embodiment of the present system for autonomously tracking a target from an air vehicle comprises an automatic target recognition (ATR) module configured to receive video information, process the video information, and produce ATR information including target information. The system further comprises a multi-sensor integrator (MSI) module configured to receive the ATR information, an air vehicle state input and a target state input, process the inputs and produce track information for the target. The system further comprises a target module configured to receive the track information, process the track information, and produce predicted future state target information. The system further comprises an ownship module configured to receive the track information, process the track information, and produce predicted future state air vehicle information. The system further comprises a planner module configured to receive the predicted future state target information and the predicted future state air vehicle information and generate travel path information including fight and camera steering commands for the air vehicle.

One embodiment of the present methods of autonomously tracking a target from an airborne vehicle comprises the steps of receiving video information input to an automatic target recognition (ATR) module, processing the video information, and producing ATR information. The method further comprises the steps of receiving the ATR information, air vehicle state information and target state information as inputs to a multi-sensor integrator (MSI), processing the inputs and producing track information. The method further comprises the steps of receiving the track information as an input to a target module, processing the track information, predicting a future state of the target and producing target information. The method further comprises the steps of receiving the track information as an input to an ownship module, processing the track information, predicting a future state of the air vehicle and producing ownship information. The method further comprises the steps of receiving the target information and the ownship information as inputs to a planner module and generating a travel path for the air vehicle.

Another embodiment of the present system for autonomously tracking a target from an air vehicle comprises means for receiving video information, processing the video information, and producing automatic target recognition (ATR) information including target information. The system further comprises means for receiving the ATR information, an air vehicle state input and a target state input, processing the inputs and producing track information for the target. The system further comprises means for receiving the track information, processing the track information, and producing predicted future state target information. The system further comprises means for receiving the track information, processing the track information, and producing predicted future state air vehicle information. The system further comprises means for receiving the predicted future state target information and the predicted future state air vehicle information and generating travel path information including flight and camera steering commands for the air vehicle.

The features, functions, and advantages of the present embodiments can be achieved independently in various embodiments, or may be combined in yet other embodiments.

BRIEF DESCRIPTION OF THE DRAWINGS

The embodiments of the present system and methods for autonomous tracking and surveillance now will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts:

FIG. 8 is a schematic view of one embodiment of the present system including a UAV and a ground station.

DETAILED DESCRIPTION

Embodiments of the present system and methods for autonomous tracking and surveillance are configured to enable an unmanned air vehicle (UAV) continuously to observe stationary and track moving targets while maintaining a low risk that the surveillance asset will be discovered. The targets may be ground-based, airborne and/or seaborne. The targets may be fixed structures, such as buildings, and may even be subsurface. The automated UAVs may also conduct general surveillance of an area, such as for defense of a base or fleet, and for monitoring roadsides for improvised explosive devices (IEDs) to protect ground-based convoys. The present system may be applied in both military and civilian environments. For example, the military may use the system to surveil or observe hostile areas in search of military targets, or a police department may use the system to track fleeing suspects.

The system accepts target data and UAV data (and may accept other data, such as obstruction data and/or "blue force" data from the UAV or a ground station). The system then determines the best navigation route to maintain an advantageous slant range to the target for high quality camera imaging and a low probability of intercept (LPOI). The system then computes trajectories/flight paths to reduce the likelihood of discovery of the UAV (also referred to herein as "ownship"). The system may incorporate numerous tracking and maneuver techniques, including weaves, orbits, escapes, and lead/lag pursuit course estimations. The system also controls the camera aboard the UAV to maintain uninterrupted visual contact with the target. The system is adapted to control both navigation and camera functions simultaneously.

Because the present system is automated it drastically reduces the workload of any operator(s) monitoring the system. The system thus enables tracking of high value moving targets while reducing the likelihood of a loss of positive identification (interruption in target viewing) during target tracking. The operator can "fly the camera," because he or she is relieved of the dual duty of navigating the UAV and maintaining the desired pointing of the camera. The operator is thus able to focus on stalking targets, scanning borders, looking for IEDs, etc. The system also enables a single operator to track multiple moving targets simultaneously, increasing the probability of engaging a high value target after an external attack or a base intrusion incident. Because one operator working at a single location, such as an Insitu Multiple UAV Software Environment (IMUSE) station, may track multiple targets, the present system reduces the logistical footprint necessary for target tracking. The present system also allows an operator to control multiple UAVs to track maritime targets. It can establish a visual identification area around deep sea and littoral fleets to monitor, track and identify small or large moving objects.

Figure 1:
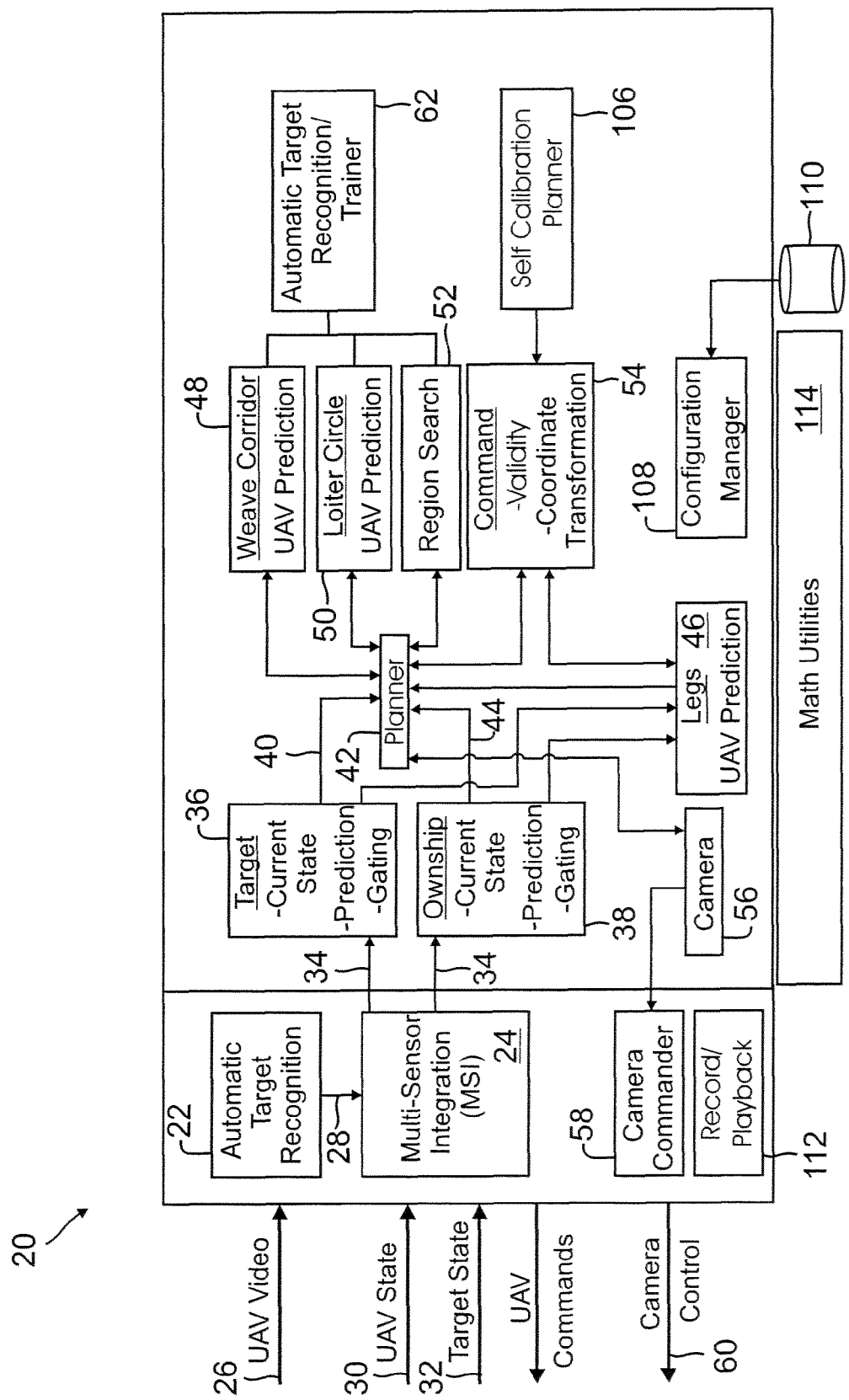
FIG. 1 is a functional block diagram of one embodiment of the present system and methods for autonomous tracking and surveillance.

In one embodiment, a system (also referred to herein as a "Stalker system") and associated methods provide automatic generation of UAV and camera steering controls for target following. The Stalker system itself may be implemented as software executable code, specialized application specific integrated circuits (ASICs), or a combination thereof, where some functions are implemented in hardware and others in executable code. In a high-level sense, the Stalker system can operate as a finite state machine where the states are steps in a plan to achieve a certain desired trajectory. The Stalker system accepts target and UAV state updates, and when engaged may be queried for UAV and camera commands. FIG. 1, which is described in detail below, illustrates this process. Each UAV command query checks for a planning state transition and may output a new UAV steering command depending upon the selected mode.

Embodiments of the Stalker system support at least four main functions. One function is generating UAV and camera positions and orientations for stalking a cooperative moving target. A cooperative moving target is one that actively publishes its own geodetic position, as is typical of friendly forces. Another function is generating UAV and camera position and orientation commands for stalking a non-cooperative moving target, whether the tracking is autonomous, or by an operator using a camera joystick. A non-cooperative moving target is one whose position must be observed through the use of electronic sensors and operator inputs, as is typical of hostile forces. Another function is generating UAV and camera position and orientation commands for automatic camera and position calibration to reduce target location errors. Another function is generating UAV and camera position and orientation commands for stalking a roadside or a search area, and generating subsequent commands to revisit targets if targets of interest are detected in those specified areas.

One goal of the Stalker system is to establish and maintain a range to target between preset minimum and maximum values. These values are specified to provide a large number of pixels on the target, while maintaining noise and visual signatures that the target is not likely to detect. Another goal of the Stalker system is to maintain an uninterrupted line of sight to the target, taking care to avoid obstructing viewing angles with the wing and fuselage.

In embodiments of the present system, a UAV (not shown) includes at least one video camera, which may be a digital camera. For simplicity the singular form of camera will be used throughout, although those of ordinary skill in the art will appreciate that the UAV may include more than one camera. The UAV further includes a plurality of sensors. A first subset of the sensors detects various states of the UAV, while a second subset of the sensors detects various states of the target. The detected states may include, but are not limited to position, orientation, heading, speed, acceleration and other kinematic states, size, type and/or class of the target, and other states. A video signal generated by the camera and signals generated by the sensors are transmitted to hardware components that use the signals to visualize and track the target. FIG. 1 illustrates some of these components. Some or all of the components illustrated in FIG. 1 could be located on the UAV or they could be located at one or more ground stations. The components could also be split between the UAV and one or more ground stations. FIG. 8 illustrates an example embodiment of the present system including a UAV 74 and a ground station 134.

As used in this disclosure, the terms "component", "module", "system." and the like are intended to refer to a computer-related entity, either hardware, a combination of hardware and software, software, or software in execution. For example, a component may be, but is not limited to being, a process running on a processor, a processor, a hardware component, an object, an executable, a thread of execution, a program, and/or a computing system. Also, these components can execute from various computer readable media having various data structures stored thereon. Computer executable components (or code) can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

With reference to FIG. 1, one embodiment of the present system 20 includes an automatic target recognition (ATR) module 22 and a multi-sensor integration (MSI) module 24. As used herein, the term module may include any combination of hardware, firmware, and software to implement the functions described. The ATR module 22 receives a video signal 26 from the UAV (not shown). The ATR module 22 includes instructions to analyze the video signal 26 and generates an output 28 that it sends to the MSI module 24. In addition to the ATR output 28, the MSI module 24 also receives a UAV state signal 30 and a target state signal 32. The signals 30, 32 are generated by the sensors described above, and may also be generated by other sources observing the UAV and/or the target, such as ground-based observers, radar, satellites, etc. All of these signals include information about the states of the UAV and the target, which may include position, orientation, heading, speed, acceleration and/or other kinematic states, size, type and/or class of the target, and other states.

The MSI module 24 receives inputs 28, 30, 32 described above and processes the data therein to produce an output 34. The MSI module output 34 is referred to herein as track information or a track file. The track file 34 includes not only information regarding the kinematics of the UAV and the target, but also estimates of the accuracy of the data in the track file 34, and also target identification data, such as the size, class, and/or type of the target, whether the target is cooperative or non-cooperative, etc. Those of ordinary skill in the art will appreciate that the track file may or may not be stored in memory for subsequent retrieval. The word "file" is used broadly herein and does not imply that the process of producing the track file 34 includes an additional step of storing the file in memory.

The MSI module 24 sends the track file 34 to a target module 36 and an ownship module 38. The target module 36 processes the data in the track file 34 relating to the current state of the target, and compares (Gates) this data to previous predictions made regarding the current state of the target. The target module 36 uses all available data and comparisons between past predictions and current states, and makes further predictions about future states of the target. Gating in target module 36 produces an output 40 that it sends to a planner module 42.

Ownship module 38 processes the data in the track file 34 relating to the current state of the UAV, and compares (Gates) this data to previous predictions (not shown) made regarding the current state of the UAV. Discrepancies in the predicted state of the UAV versus its current state may be due to, for example, winds blowing the UAV off its intended course. The ownship module 38 uses all available data and comparisons between past predictions and current states, and makes further predictions about future states of the UAV. Gating in ownship module 38 then produces an output 44 that it sends to the planner module 42.

The planner module 42 combines the target module input 40 and the ownship module input 44 with additional data provided by a legs module 46, a weave corridor module 48, a loiter circle module 50, a region search module 52, a command module 54 and a camera module 56. The functions of each of these modules are described in detail below. Based on the various inputs, the planner module 42 builds a model for predicting future UAV states given its current state and the currently active command. The planner module 42 uses the model to predict future UAV states at certain critical times, and to establish goals, which in turn produce predicted UAV and camera positions. The planner 42 also combines all data to produce commands for course corrections and/or pattern adjustments for the UAV. These adjustments are described below with respect to three top-level goal states for the UAV. The present system 20 uses all of the functions described above extensively in stalking both cooperative and non-cooperative targets.

With continued reference to FIG. 1, the legs module 46 predicts a long-term flight path for the UAV. In support of the long-term predictions, the legs module 46 also predicts short-term legs that together make up the long-term flight path. The legs module 46 communicates its predictions to the planner module 42 to aid the planner module 42 in creating UAV commands to control the flight of the UAV.

With continued reference to FIG. 1, in certain embodiments the command module 54 includes data regarding the UAV mission environment. This data may include, for example, topographical terrain maps, locations of international borders, locations of obstructions and other data. The data may also include the locations and kinematics of other aircraft in the vicinity. By accessing the data in the command module 54, the present system 20 can command the UAV to maintain an uninterrupted track on a target while avoiding collisions/crashes and crossing into no fly zones. The command module 54 also validates UAV commands to ensure that the UAV is capable of executing the commands to achieve the desired flight path. For example, if a UAV command indicates that the UAV should execute a very tight turn that is beyond the UAVs physical limits, the validity function of the command module 54 will reject the command as being impossible for the UAV to execute.

With continued reference to FIG. 1, the present system 20 further comprises a camera module 56 and a camera commander module 58. The camera module 56 predicts future camera imaging characteristics, such as pointing, focus and zoom. The camera module 56 communicates with the planner module 42 and generates outputs for the camera commander module 58. The camera commander module 58 generates commands 60 for the camera, such as where to point and how to focus and zoom. Together the camera module 56 and the camera commander module 58, in conjunction with the planner module 42, automatically control camera functions in order to obtain an uninterrupted and high quality image of the target.

In certain embodiments the camera and/or sensors may provide additional information beyond that generally provided by traditional visual surveillance. For example, the camera/sensors may provide three-dimensional visual representations of the target. These three-dimensional views are enhanced by multi-aspect viewing of the target in accordance with the loiter, weave, and chase surveillance patterns described below. The camera/sensors may further provide thermal signature information, infrared signature information, color information, etc. for the target. All information collected by the camera/sensors may be provided to an ATR/Trainer module 62 (FIG. 1), described below, for use in future target identifications. Multiple aspect coverage of the target enables the automatic target recognition function of the present system 20, described below, to recognize geometric aspects of the target that are not available in two-dimensional or single aspect imagery, drastically decreasing the time necessary for the present system 20 to recognize the target.

Figure 2:
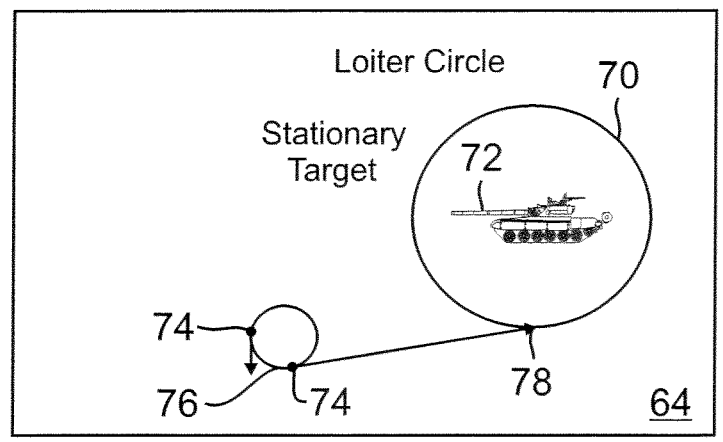
FIG. 2 is a schematic view of a loiter circle according to one embodiment of the present system and methods for autonomous tracking and surveillance.
Figure 3:
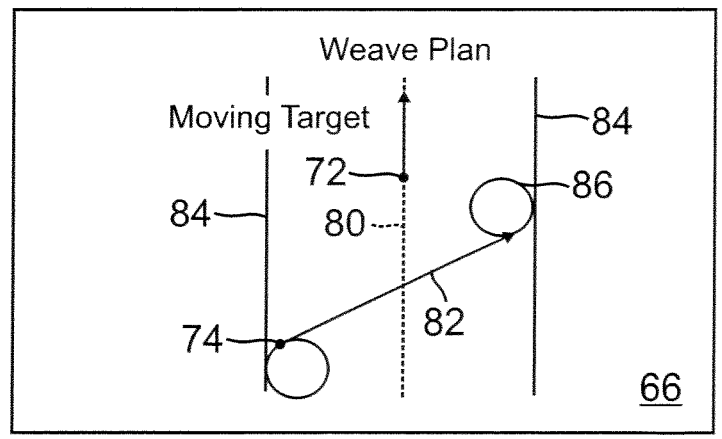
FIG. 3 is a schematic view of a weave plan according to one embodiment of the present system and methods for autonomous tracking and surveillance.
Figure 4:
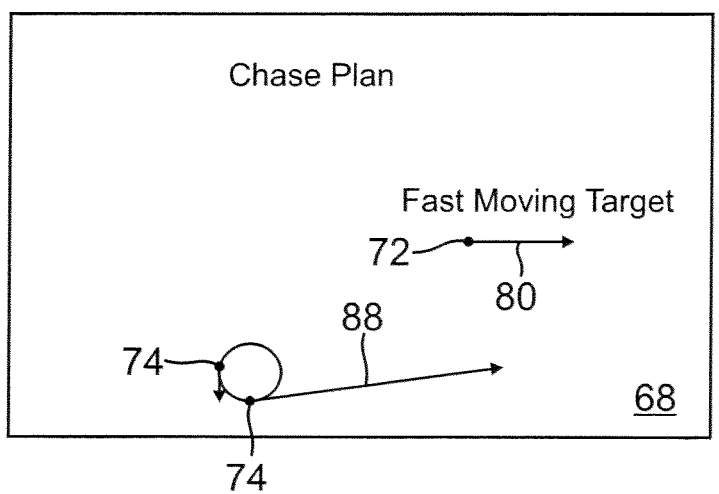
FIG. 4 is a schematic view of a chase plan according to one embodiment of the present system and methods for autonomous tracking and surveillance.

While in cooperative and non-cooperative stalking modes, and prior to receiving either the UAV state input 30 or the target state input 32, the Stalker system 20 is in a startup state. Once the system 20 has received both the UAV state input 30 and the target state input 32, the system 20 is queried for a steering command and/or a camera command. The system 20 then transitions from startup to a top-level goal state. These top-level goal states include loiter 64, weave 66, and chase 68, each of which are illustrated in FIGS. 2-4, respectively. Those of ordinary skill in the art will appreciate that additional top-level goal states may be provided depending upon the state of the target.

Each top-level goal state corresponds to a dynamically generated plan to attain a desired UAV trajectory for advantageous imaging quality while controlling visual and audio signatures of the UAV. Each top-level goal state is also intended to prevent over flight of the target, which could cause the target to detect the UAV. Consistent with these objectives, then, at least target speed and UAV speed determine the top-level goal. For example, if target speed is zero or near zero, the coal may be to loiter in a circle 70, as illustrated in FIG. 2. The loiter path 70 may encircle the target 72, or it may be somewhere in the vicinity of the target 72. Further, the loiter path 70 need not be a circle, but could be some other shape. If target speed is not near zero and is less than UAV speed, the goal may be to weave back and forth behind the target 72, as illustrated in FIG. 3. If target speed is high, the goal may be to chase the target 72, as illustrated in FIG. 4. The top-level goal changes dynamically as the target 72 accelerates, decelerates, stops and starts.

Corresponding to each top-level goal are goal-specific planning states, or steps to achieve the top-level goal. These steps are mapped to steering commands that are scheduled to be sent to the UAV at specified times. Planning a UAV trajectory involves reasoning in both space and time and predicting how the UAV will respond to commands. Therefore, accurately planning a UAV trajectory preferably includes an estimate of the command time latency and a model of how the UAV will maneuver when it executes the command.

When loitering, each UAV maneuver is executed pursuant to commands generated by the planner module 42 in conjunction with the loiter circle module 50 (FIG. 1). The loiter circle module 50 makes predictions regarding the future state of the UAV, which the planner module 42 uses to generate loiter commands for the UAV. In the case of a circular loiter path 70 (FIG. 2), a loiter command has three parts: a turn center (a co-altitude geodetic location), a turn radius, and a turn direction (clockwise or counter-clockwise as viewed from above). Thus, when the system 20 determines that the UAV should loiter, as when the target 72 is stopped, the planner 42 and the loiter circle module 50 generate at least one loiter point for the UAV. The loiter point(s) is/are sent to the hardware that controls the UAV's movement along with camera pointing commands.

In one embodiment, if the aircraft is outside the commanded loiter circle 70 then it executes a loiter command as follows. With reference to FIG. 2, the UAV 74 makes an initial turn 76 so that its direction of flight is tangential to the loiter circle 70 and is compatible with the commanded turn direction. The UAV 74 then flies straight to the tangent point 78. Upon reaching the tangent point 78 the UAV 74 flies around the loiter circle 70 until commanded to do otherwise. Each of these UAV maneuvers are executed pursuant to commands generated by the planner module 42 in conjunction with the loiter circle module 50 (FIG. 1).

When the loiter path 70 encircles the target 72, the loiter plan advantageously provides full 360° imaging of the target 72. Images captured and other sensor readings taken from such 360° degree sweeps can advantageously provide full geometric data regarding the target 72 to the ATR module 22. In one embodiment the ATR/Trainer module 6' (FIG. 1) automatically logs the target data and attempts to identify the target. If the target cannot be identified, then the ATR/Trainer module 62 classifies the target as a new entity and records the data. This data may be shared system wide, including continuous dissemination to other UAVs in the field. The present system 20 thus rapidly increases its knowledge base as UAVs in the field gather more and more data about new targets and share that data with other UAVs in the field.

With reference to FIG. 3, when commanded to execute a weave plan 66 the UAV 74 moves back and forth across the target's path of travel 80, and behind the target 72. When weaving, each UAV maneuver is executed pursuant to commands generated by the planner module 42 in conjunction with the weave corridor module 48 (FIG. 1). The weave corridor module 48 makes predictions regarding the future state of the UAV 74, which the planner module 42 uses to generate weave commands for the UAV 74. Again, the weave plan 66 is generally used for targets 72 that are traveling slower than or about the same speed as the UAV 74. The weave plan 66 provides for a snake-like motion behind the moving target 72, keeping visual and audio signatures at levels not likely to be detected by the target 72. The crisscrossing path 82 provides wide aspect coverage of the aft and sides of the target 72 for advantageous intelligence and potential ATR data. This technique also makes it extremely difficult for occupants of the target 72 to spot the UAV 74 due to their orientation away from the UAV 74.

The weave plan 66 may include boundaries 84 that extend substantially in the same direction as the target's path of travel 80. The weave corridor module 48 and/or the command module 54 may provide these boundaries 84. The boundaries 84 may be established to maintain a desired distance between the UAV 74 and the target 72, and/or, the boundaries 84 may coincide with national borders, no fly zones, physical obstructions, etc. When the UAV 74 approaches one of the boundaries 84, it may enter a circular path of travel 86 where it may execute one or more loops around the circle 86 before heading back across the target's path of travel 80 toward the opposite boundary 84. Those of ordinary skill in the art will appreciate that the weave plan 66 may embody other patterns besides that illustrated in FIG. 3. For example, the UAV 74 may weave back and forth without executing any of the substantially circular loops 86 near the boundaries 84.

With reference to FIG. 4, when commanded to execute a chase plan 68 the UAV 74 moves along a straight path 88 that may be parallel to the target's path of travel 80 or at an angle toward the target's path of travel 80. Again, the chase plan 68 is used for targets 72 moving faster than the UAV 74. By moving along a straight path 88 generally toward the target 72, the UAV 74 is enabled to catch up to, or at least stay with, a fast-moving target 72. In one embodiment of the present system 20, predictive logic establishes a lead or lag pursuit plan based upon ownship position and target kinematics in order to maximize the camera time on target. Predictions for camera position can also be generated to keep the camera on target while the chase ensues.

Figure 5:
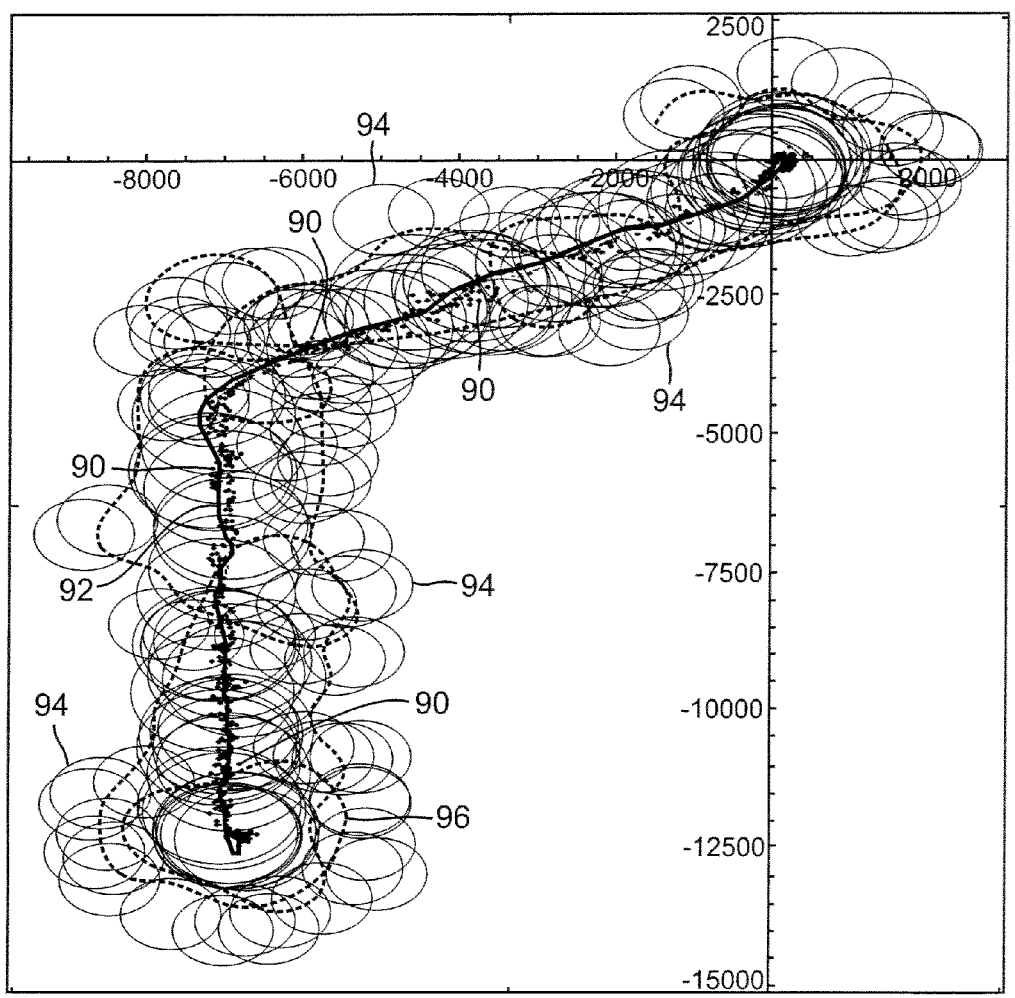
FIG. 5 is a schematic view of a method of smoothing noisy tracking data according to one embodiment.

The target kinematics, which are contained in the target state input 32 (FIG. 1), can be given to the Stalker system in several different modes. One mode is from a cooperative target. For example, the target may be located using GPS or tracked by an external source. Another mode is the operator tracking the moving target via joystick on an image. Another mode is tracking the object internally from external sensor reports such as electronic support measures (ESM), radar, automatic/assisted target recognition (ATR) feeds, identify friend/foe (IFF) or other kinematic updates. The first and third of these methods are stable and can be used in the goal and planning cycles as is. The second method, which involves an operator and a joystick, produces noisy data that is preferably smoothed in order to obtain a clear track for the target. With reference to FIG. 5, a plurality of dots 90 represent known locations of the target taken at various sampling intervals. The heavy black line 92 in FIG. 5 represents the smoothed trajectory of the target based on the data points 90. The data points 90 are provided by a UAV that is commanded to follow a progression of orbits 94 shown as ellipses in FIG. 5. The dashed line 96 indicates the actual flight path of the UAV as it transitions between the commanded orbits.

In certain embodiments of the present system 20 the UAV may be commanded to search for targets. In the search mode of operation, the UAV automatically searches a designated region, which may have any shape, including a circle, an ellipse, a polygon or any other shape. When searching, the UAV may limit visual and aural signatures to reduce the likelihood of the UAV being discovered. In the search mode of operation the region search module 52 (FIG. 1) establishes search boundaries, which may be loaded from the command module 54. While searching, it is advantageous for the UAV to avoid entering restricted airspace, avoid crossing over international borders into the airspace of uncooperative nations, and avoid collisions with terrain and man-made obstructions. Thus, the region search module 52 in conjunction with the command module 54 determines advantageous search patterns while accounting for terrain avoidance, border avoidance, obstruction avoidance, and RF link masking. As described above, in certain embodiments the command module 54 includes data such as topographical terrain maps and locations of borders and obstructions that the planner 42 and the region search module 52 can access to assist in avoiding collisions/crashes and crossing into no fly zones.

In some embodiments, while the UAV searches the system 20 compares the video signal 26 from the UAV with video from previous searches to locate possible targets. The system 20 may also process the video stream to locate new hot spots (using, for example, infrared scans), and identify pixel changes to detect scene changes. The system 20 may scan for infrared signatures, and may identify differences in the search area in the electro-optical (EO), infrared (IR) and electronic warfare (EW) bands to spot new targets in the area. The system 20 may process these inputs using the ATR/Trainer module 62 to identify known targets of opportunity. These functions may operate autonomously to detect and locate targets. Once a target is located, additional data may be collected. During the collection of additional data the UAV may follow one or more of the navigation plans outlined above (loiter 64, weave 66, chase 68) to collect sensor data while avoiding discovery of the UAV. Once desired data has been collected, the search pattern may resume.

In the search mode, the planner 42 and the region search module 52 may command the UAV to fly in a random fashion, following headings selected at random, and/or changing from one heading to the next at random intervals. Such random flight increases the difficulty of targeting the UAV from the ground, making it less likely that the UAV will be lost to enemy fire. Random flight also confuses ground forces as to the makeup, intended target(s) and number of UAVs covering an area, and makes it difficult for enemy forces to determine the launch/recovery location(s) of UAVs.

Figure 6:
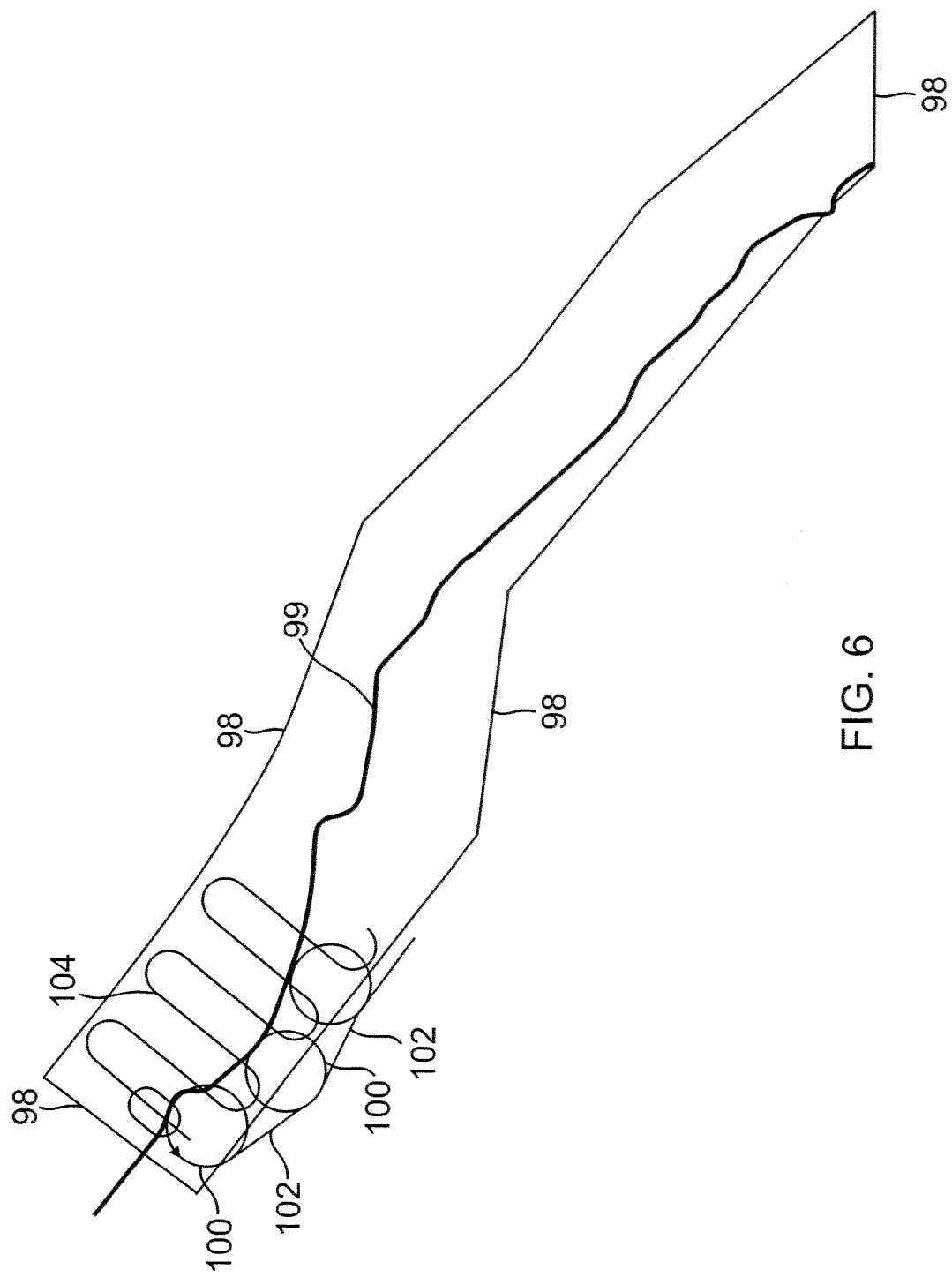
FIG. 6 is a schematic view of a systematic search pattern in which the UAV remains on one side of a border while capturing visual images across the border according to one embodiment.

Alternatively, the planner 42 and the region search module 52 may command the UAV to follow a systematic search pattern. FIG. 6 illustrates one such systematic pattern. The region search module 52 (FIG. 1) establishes search boundaries 98. As illustrated, the search boundaries overlap an international border 99 with a hostile nation. Thus, the planner module 42 works together with at least the command module 54 to establish a travel path for the UAV that keeps the UAV from crossing the border 99. As shown, the UAV follows a travel path represented by a series of loiter circles 100 joined by tangent lines 102. The circles 100 and lines 102 keep the UAV on one side of the border 99. However, the camera follows a scanning path 104 represented by a series of oppositely oriented U's that cross the border 99. The UAV moves from one loiter circle 100 to the next while the camera scans in the repeating U pattern 104 shown. Thus, while the UAV never violates the airspace of the hostile nation, the camera is nevertheless able to capture visual images within the hostile nation. This pattern of border avoidance is known as "lawn mowing," as it is analogous to a person who looks over his or her neighbor's fence as he or she mows his or her own lawn. The flight path traced by the UAV may include loiter circles 100 as shown in FIG. 6, and it may also include the weave and chase plans described above.

With reference to FIG. 1, the illustrated embodiment of the present system 20 includes a self-calibration planner module 106. At designated intervals the UAV may be commanded to enter a self-calibration mode. In this mode, the UAV loiters in a circle around a fixed surveyed location. In each quadrant of the loiter circle, the system 20 generates camera pointing commands at the fixed location. External sensors, such as GPS, are used to precisely locate the fixed target so that camera pointing errors can be measured. Differences between where the camera should be pointing and where it is actually pointing are then resolved so that target location errors are reduced and weapons probability of kill (PK) is increased. This calibration routine can be executed around a 360° sweep of the fixed location to characterize the repeatable errors in navigation and camera angle pointing. A characterization table may then be generated that can be used when calculating target location error (TLE) for a given target, as well as when compensating for camera pointing errors at known coordinates from other systems.

One instance in which it is advantageous to recalibrate the camera aboard the UAV is shortly after the UAV launches. Whether the UAV takes off from the ground under its own power, is launched from the ground or is launched from an airborne mother ship, the UAV can experience high G-forces during each of these procedures. The G-forces can cause servo errors and generate calibration problems. Therefore, the UAV may be commanded to self calibrate shortly after takeoff/launch. For airborne launches, the UAV may fly in a circle about the mother ship, which may include differential GPS to precisely locate the mother ship. The UAV may also be commanded to self calibrate at one or more points during its mission. For example, the UAV may also be commanded to self calibrate at regular intervals.

With reference to FIG. 1, the illustrated embodiment of the present system 20 further includes a configuration manager module 108. The configuration manager 108, in combination with a storage device 10, saves one or more configurations of the present system 20. For example, the configurations may include operator inputs and target characteristics. By storing these configurations on the storage device 110, the configuration manager 108 can quickly recall them when the system 20 is restarted so that the configurations do not need to be learned again.

With continued reference to FIG. 1, the illustrated embodiment of the present system 20 further includes a record/playback module 112. The record/playback module 112 is configured to record data as the UAV(s) track various targets. The recorded data may be played back later to assist in evaluating the overall performance of the system 20.

In certain embodiments, the present system 20 may include an internet protocol-(IP) based addressing scheme. In such a scheme, each UAV in the system 20 is identifiable by a unique IP address, and all other UAVs and operators in the system 20 can communicate with each UAV using those addresses. This addressing scheme enables multiple UAVs to be incorporated into the system 20 regardless of what type of control system may have been previously built into each UAV. For instance, a UAV may have been manufactured by a first entity, and may be configured for operation according to the first entity's proprietary control system. The IP-based addressing scheme stands in front of the proprietary system so that the UAV can be incorporated into the present system 20 without requiring translation between control systems.

With reference to FIG. 1 in certain embodiments the present system 20 includes a set of utilities 114. Utilities 114 include a set of math functions and transforms that each of the modules may reference to perform the calculations to enable the Stalker system 20 to work.

Figure 7:
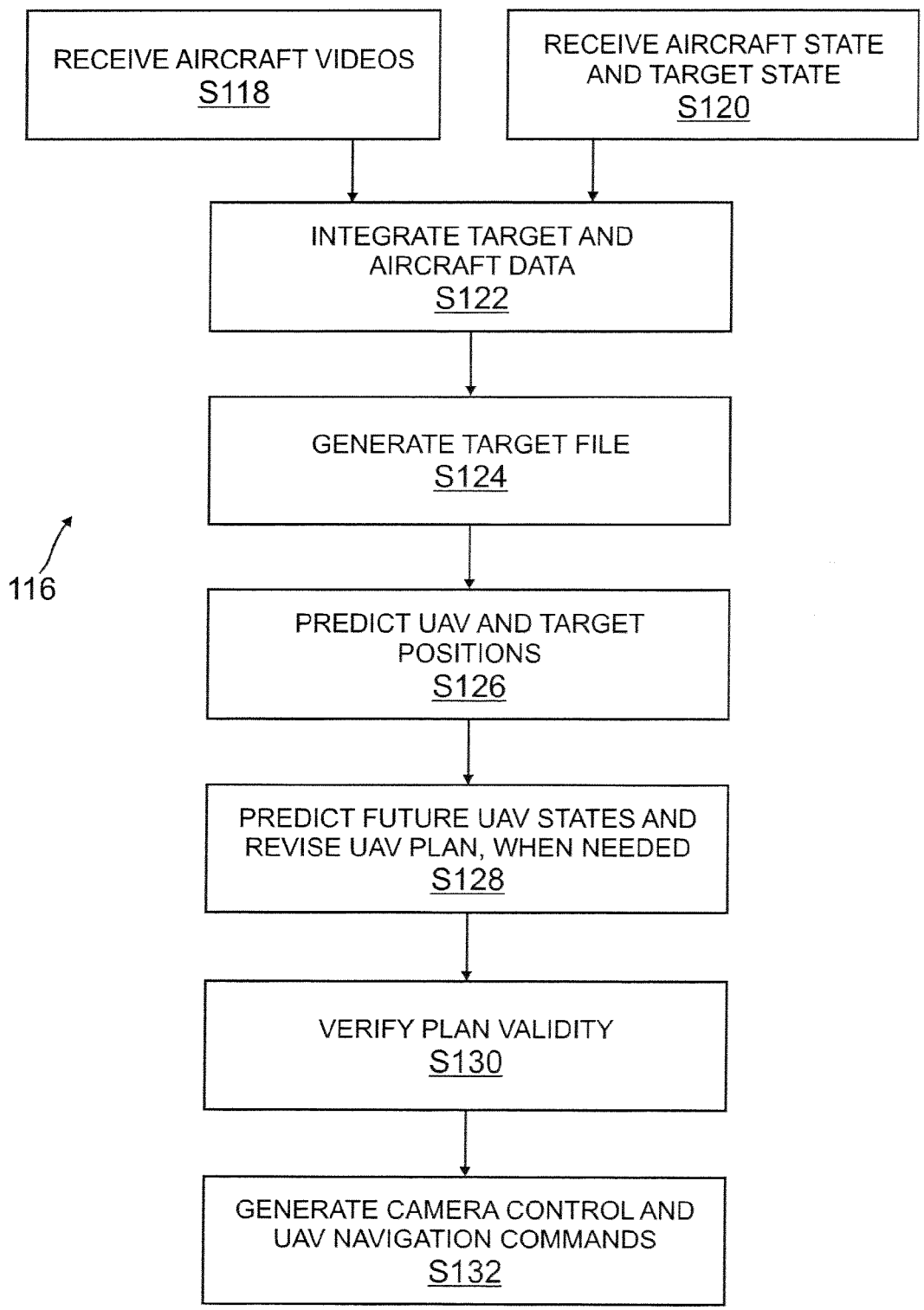
FIG. 7 is a process flow diagram for autonomously tracking a target using a UAV according to one embodiment.

FIG. 7 shows a process flow diagram 116 for autonomously tracking a target using a UAV. As an example, the process steps may be implemented using the various Stalker system 20 modules described above. Process flow 116 assumes that system 20 (FIG. 1) and its various modules are initialized and functional.

Turning in detail to FIG. 7, in step S118, video signals (for example, 26) are received from a UAV (not shown). In one example, ATR module 22 receives the video signal. ATR module 22 analyzes the video signals and generates an output for an integration module (for example, MSI 24). In step S120, UAV state and target state information is received by MSI module 24.

In step S122, MSI module 24 integrates the target state, UAV state and the filtered video information from ATR module 22 and in step S124, MSI module 24 generates a track file. As discussed above, the track file may include information regarding UAV and target kinematics, estimates for data accuracy, target related information for example, size, class, target type, whether target is cooperative or non-cooperative or any other information.

In step S126, future UAV and target positions are predicted after comparing track file information with previous predictions.

In step S128, future UAV states are predicted and either UAV plan is created (if one does not exist) or an existing UAV plan is modified. In one embodiment, planner module 42 creates and modifies the UAV plan. The plan is based on inputs received from one or more modules, for example, target module 36, ownship module 38, weave corridor module 48, loiter module 50, legs module 46, region search module 52, command module 54 and camera module 56 that are described above. The plan itself may be a model to predict future UAV states.

In step S130, the plan is verified and validated. In one embodiment, the plan is validated by the command module. Thereafter, camera control commands and navigation commands are generated in step S132. Examples of various inputs/outputs for implementing and executing the process steps of FIG. 7 are described above.

The above description presents the best mode contemplated for carrying out the present system and methods for autonomous tracking and surveillance, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method of autonomously tracking a moving target from an airborne air vehicle, the method comprising the steps of:
   receiving video information input to an automatic target recognition (ATR) module comprising first hardware, the video information comprising target state information of motion of the target including at least speed and acceleration of the target, processing the video information, and producing ATR information;
   receiving the ATR information, air vehicle state information, and target state information as inputs to a multi-sensor integrator (MSI) comprising second hardware, wherein a first set of sensors detects states related to the vehicle and a second set of sensors detects states related to the target;
   integrating in the multi-sensor integrator the video information, the air vehicle state information, and the target state information to produce track information, the track information including kinematic information of the vehicle and target information data;
   receiving the track information as an input to a target module comprising third hardware, processing the track information, predicting a future state of the target and producing target information;
   receiving the track information as an input to an ownship module comprising fourth hardware, processing the track information, predicting a future state of the air vehicle and producing ownship information, the ownship information including a flight path configured to reduce a likelihood of discovery;
   receiving the target information and the ownship information as inputs to a planner module comprising fifth hardware and generating a travel path for the air vehicle;
   automatically generating, using a first physical processor, control commands for a camera using the predicted future state of the target and the predicted future state of the air vehicle, the control commands including pointing, focus, and zoom to obtain the video information; and generating a weave plan for the air vehicle, using a second physical processor, wherein an execution of the weave plan comprises moving back and forth across a path of the target and behind the target.

2. The method of claim 1, further comprising the step of storing the track information as a track file.

3. The method of claim 1, further comprising at least one of:
generating a loiter plan for the air vehicle, the loiter plan being designed to maintain a desired distance between the air vehicle and the target while the target is stationary;
generating a region search plan for the air vehicle, the region search plan being designed to allow the air vehicle to scan an area;
analyzing an anticipated path of travel for the air vehicle and determining whether the path crosses into any restricted airspace or intersects any obstructions;
cataloging information about the target;
calibrating navigational sensors aboard the air vehicle;
predicting a flight path for the air vehicle; and
recording data associated with a tracking operation.

4. The method of claim 1, further comprising the step of predicting, using a camera module, future imaging characteristics for a camera aboard the air vehicle.

5. The method of claim 4, wherein the air vehicle further comprises a camera and a camera command module configured to control pointing, focus, and zoom of the camera.

6. The method of claim 1 wherein, a weave corridor module provides information to a planner to generate the weave plan.

7. The method of claim 1, wherein at least a portion of the boundaries coincide with at least one of a national border, an edge of a no fly zone and a physical obstruction.

8. The method of claim 1, further comprising generating a loiter plan for the air vehicle, the loiter plan being designed to maintain a desired distance between the air vehicle and the target while the target is stationary.

9. The method of claim 8, wherein a loiter circle module provides information to a planner is configured to generate the loiter plan.

10. The method of claim 1, further comprising generating a region search plan for the air vehicle, the region search plan being designed to allow the air vehicle to scan an area.

11. The method of claim 10, wherein a region search module provides information to a planner is configured to generate the region search plan.

12. The method of claim 1, further comprising the step of:
determining whether the path crosses into any restricted airspace or intersects any obstructions based on an analysis of an anticipated path of travel for the air vehicle.

13. The method of claim 1, further comprising the step of: cataloging information about the target in an automatic target recognition module.

14. The method of claim 1, further comprising the step of: predicting future imaging characteristics for the camera aboard the air vehicle.

15. The method of claim 1, wherein the air vehicle is an unmanned aircraft.

16. The method of claim 1, wherein the ATR is positioned at a ground station.

17. The method of claim 1, wherein the weave plan is designed to maintain a desired distance between the air vehicle and the target while the target is moving and while maintaining the air vehicle within predetermined boundaries.

18. The method of claim 1, wherein the first hardware, the second hardware, the third hardware, the fourth hardware, and the fifth hardware are all part of one computer system, and wherein the first physical processor and the second physical processor are the same.

19. A method of tracking a moving target from an airborne air vehicle, the method comprising the steps of:
receiving, at a physical processor, video information comprising target state information of motion of the target including at least speed and acceleration of the target;
receiving, at the physical processor, air vehicle state information;
integrating, using the video information, the air vehicle state information, and the target state information to generate track information, the track information including kinematic information of the vehicle and target information data;
predicting, using the physical processor, a future state of the target;
predicting, using the physical processor, a future state of the air vehicle;
automatically generating, using the physical processor, a travel path for the air vehicle, including one of a loiter plan and a weave plan, wherein the travel path includes a flight path configured to reduce a likelihood of discovery of the air vehicle;
generating, using the physical processor, control commands for a camera using the predicted future state of the target and the predicted future state of the air vehicle, the control commands including pointing, focus, and zoom; and
generating, using the physical processor, a region search plan for the air vehicle, the region search plan being designed to allow the air vehicle to scan an area; and
storing the region search plan in a non-transitory computer readable storage medium.

20. The method of claim 19, further comprising analyzing an anticipated path of travel for the air vehicle and determining whether the path crosses into any restricted airspace.

* * * * *